(12) United States Patent
Taylor

(10) Patent No.: US 9,349,289 B1
(45) Date of Patent: May 24, 2016

(54) INFORMATIONAL TRAFFIC LIGHT SYSTEM THAT PROVIDES TRAFFIC LIGHT SPECIFIC INCENTIVE INFORMATION BASED ON TRAFFIC LIGHT TIMING

(71) Applicant: Kennett Paul Taylor, Oakland, CA (US)

(72) Inventor: Kennett Paul Taylor, Oakland, CA (US)

( * ) Notice: Subject to any disclaimer, the term of this patent is extended or adjusted under 35 U.S.C. 154(b) by 0 days.

(21) Appl. No.: 14/608,763

(22) Filed: Jan. 29, 2015

(51) Int. Cl.
  *G08B 21/00* (2006.01)
  *G08G 1/096* (2006.01)

(52) U.S. Cl.
  CPC ........................... *G08G 1/096* (2013.01)

(58) Field of Classification Search
  CPC ........................................ G08G 1/096
  USPC ............... 340/425.5, 439, 907, 929; 701/117
  See application file for complete search history.

(56) References Cited

U.S. PATENT DOCUMENTS

| | | | | |
|---|---|---|---|---|
| 2007/0143002 A1* | 6/2007 | Crowell | ............... | G07C 5/004 701/123 |
| 2007/0200730 A1* | 8/2007 | Kang | ............... | G08G 1/095 340/907 |
| 2010/0070128 A1* | 3/2010 | Johnson | ............... | G08G 1/096783 701/31.4 |
| 2010/0125402 A1 | 5/2010 | Bansal | | |

* cited by examiner

*Primary Examiner* — Jeffery Hofsass
(74) *Attorney, Agent, or Firm* — Fish & Richardson P.C.

(57) ABSTRACT

A system receives data describing a light state of a traffic light and timing status of the traffic light. The light states include a first state indicating the traffic light is displaying a stop signal, and a second state indicating the traffic light is not displaying a stop signal. The timing status describes the time remaining of current state to transition to another state. The system determines, based on the state of the traffic light and the timing status, one of a plurality of messages on the display device. The messages include a first message to shut off an engine.

21 Claims, 4 Drawing Sheets

INFORMATIONAL TRAFFIC LIGHT SYSTEM THAT PROVIDES TRAFFIC LIGHT SPECIFIC INCENTIVE INFORMATION BASED ON TRAFFIC LIGHT TIMING

BACKGROUND

This specification relates to traffic systems.

Idling motor vehicles release a great amount of unnecessary pollutants, including carbon monoxide and carbon dioxide. According to studies, every ten minutes of idling a vehicle can cost over one cup of wasted fuel (which leads to wasted money and unnecessary pollution). Studies also show that idling a vehicle for more than thirty seconds can lead to unnecessary pollution and costs associated with burning fuel while remaining in idle. A motorist would save gas and money and limit their pollutant emissions by turning their vehicle off when they will be idle for more than thirty seconds.

Most of the idling of vehicles occurs at traffic lights. In many circumstances, motorists may not know how long they will be sitting in one location at a traffic light; therefore, the motorist may not turn off their vehicle.

SUMMARY

This specification describes technologies relating to informational traffic light systems.

In general, one innovative aspect of the subject matter described in this specification can be embodied in a system, including a display device, a communication subsystem, and a data processing apparatus in data communication with the display device and the communication subsystem. The data processing apparatus being configured to perform the operations including receiving data describing a light state of a traffic light and timing status of the traffic light, wherein the light states include a first state indicating the traffic light is displaying a stop signal, and a second state indicating the traffic light is not displaying a stop signal; and the timing status describes the time remaining of current state to transition to another state; and determining, based on the state of the traffic light and the timing status, one of a plurality of messages to display on the display device, wherein the messages include a first message to shut off an engine.

Particular implementations of the subject matter described in this specification can be implemented so as to realize one or more of the following advantages. Light state and timing data may be specific to traffic patterns, and corresponding messages may thus be tailored to particular traffic lights. Drivers are thus more likely to notice the difference in the messages, e.g., especially for longer lights, and thereby be more likely to respond to the messages. This, in turn, leads to reductions in wasted fuel and pollution and results in both personal and societal cost savings. In some implementations, the timing data may be learned, and thus the system need not be programmed specifically for each traffic light. Thus, deployment costs are reduced.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
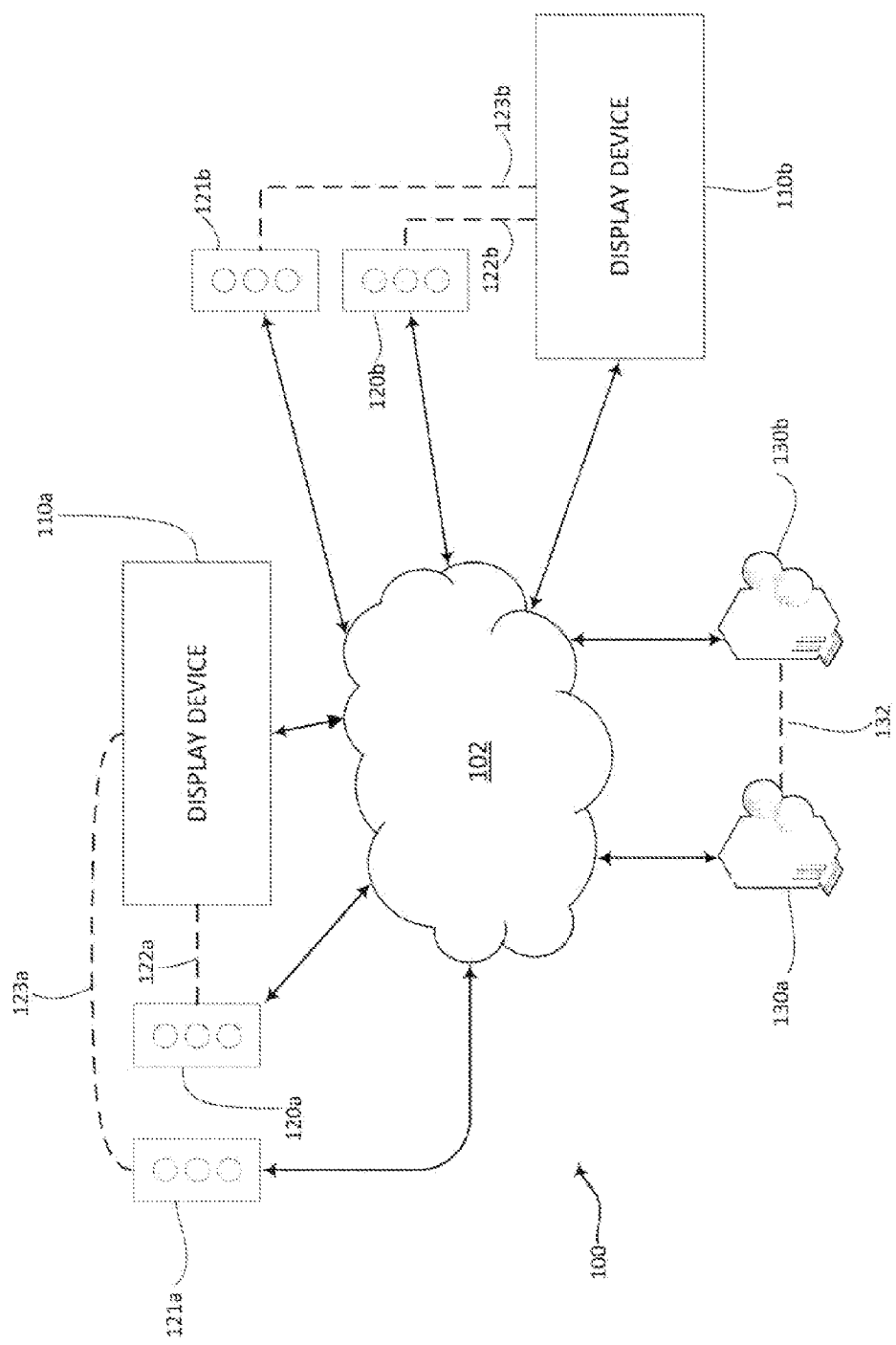
FIG. 1 is a block diagram of an informational traffic light system.

FIG. 1 is a block diagram of an informational traffic light system 100 according to various implementations of the present disclosure. The informational traffic light system 100 includes at least one traffic light (for example, 120a, 120b, 121a, 121b in FIG. 1), at least one traffic information display device (for example, 110a and 110b in FIG. 1). In some implementations, at least one monitoring office (for example, 130a and 130b in FIG. 1) is included. However, the informational traffic light system 100 may be implemented at other locations than road traffic lights, and may be used at railroad locations for vehicles and trains, among other locations. These and other systems are capable of interacting and communicating via one or more communication networks 102. The communication networks 102 may be a communication subsystem and may include telephone lines, such as land line or public switched telephone network (PSTN) systems, fiber optics, mobile phone channels and systems, satellites, satellite systems, electric lines, communication channels for exchanging data and information, such as a local area network (LAN), wide area network (WAN), Wi-Fi, the Internet, or other data, communication, or telecommunication networks.

Additionally, in some implementations, traffic information display device 110a may communicate with traffic lights 120a and 121a via connections 122a and 123a, respectively. However, in some implementations, traffic information display device 110a may communicate with one or more traffic light via one connection or through communication network 102. Also, in some implementations, traffic information display device 110b may communicate with traffic light 120b and 121b via connection 122b and 123b, respectively. However, in some implementations, traffic information display device 110b may communicate with one or more traffic light via one or more connections or through communication network 102. Moreover, in some implementations, monitoring office 130a may communicate with monitoring office 130b via connection 132. However, in some implementations, monitoring office 130a may communicate with monitoring office 130b through communication network 102. Monitoring offices 130a and 130b may be in one space or in multiple spaces. For example, monitoring offices 130a and 130b may be in a single office building, in separate office buildings, in one or more remote location (e.g., individuals working from their own location or remotely), among others.

Typically a display device 110 is associated with one traffic light 120 and positioned such that a driver can see both the display device 110 and the traffic light 120, e.g., the display device is positioned next to the traffic light. However, a display device 110 may receive data from more than one traffic light, which is used to determine an appropriate message to display, as will be described in more detail below.

Figure 2:
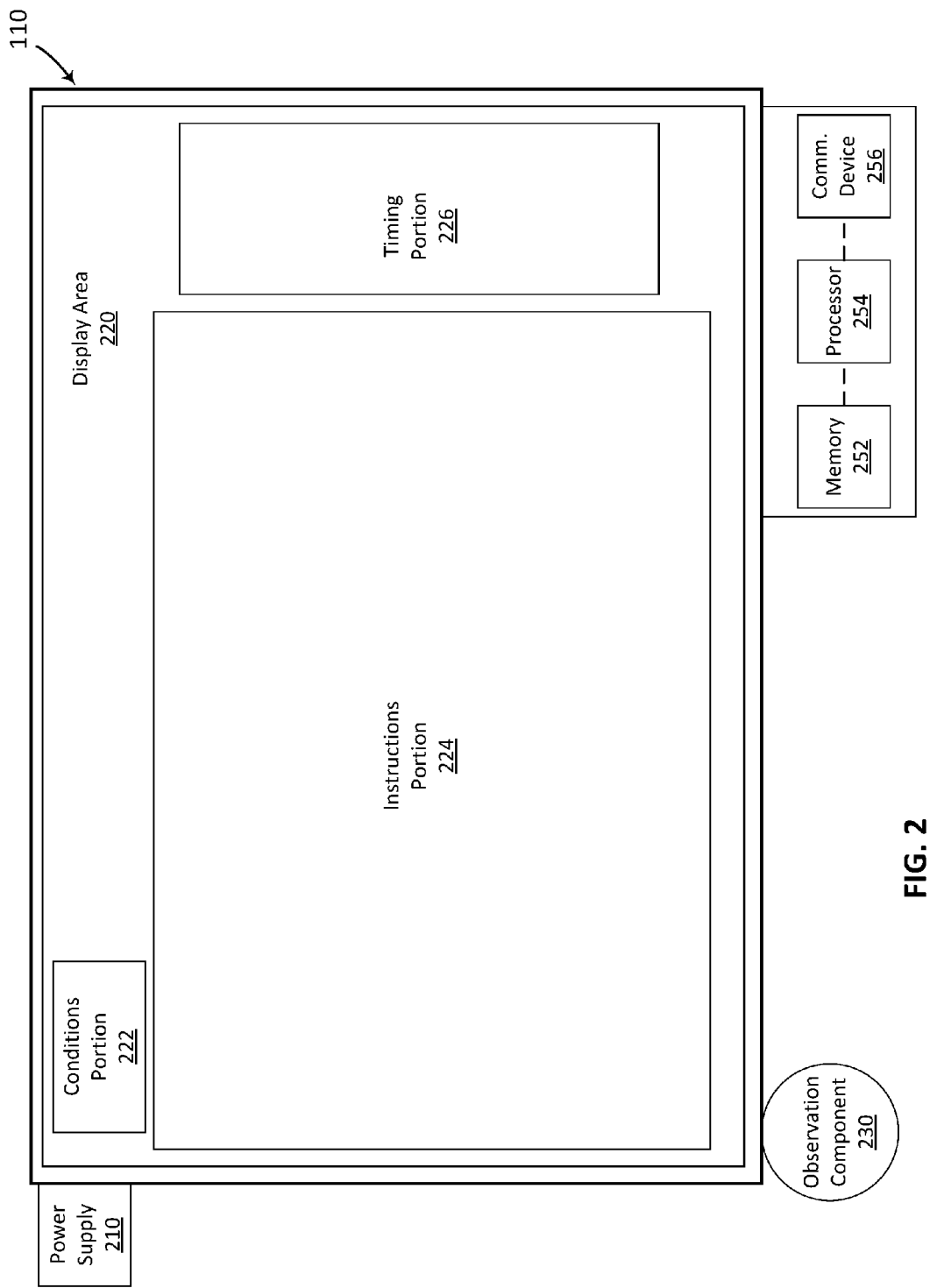
FIG. 2 is a block diagram of a traffic information display device.

FIG. 2 is a block diagram of a traffic information display device 110 (seen as 110a and 110b in FIG. 1). Traffic information display device 110 may include a power supply 210, a display area 220, an observation component 230, and a control portion 250, the control potion 250 including a memory 252 operatively connected to a processor 254. The display area 220 may include incandescent lighting (e.g., LED light bulbs), backlighting, among others. Also, the display area 220 may include a conditions portion 222, an instructions portion 224, and a timing portion 226, in which each portion corresponding data may be displayed to a drive. Further, in some implementations, the traffic lights themselves may be included in the traffic information display device.

Traffic information display device 110 may be of dimension of 12-15 inches in height, 36-48 inches in width, and 1-3 inches in depth. However, such dimensions are not meant to be limiting, and other dimensions may be used. In some implementations, components of the display area 220 may include flashing areas and components.

Power supply 210 may include an electrical connection, a solar battery, a lithium battery, lithium-ion battery, among other types of power supply known in the art.

Conditions portion 222 may include indications of past, current, or future conditions, e.g., weather conditions, the current time, a current temperature, among others.

Instructions portion 224 may display instruction messages or other information to be presented to vehicle drivers. For example, each traffic light (e.g., 120a, 120b, 121a, 121b) within the system may include its own traffic information display device 110, but in some implementations, two or more traffic lights may use one traffic information display device 110. Instruction messages provided may include instructions as to when motorists should turn on and turn off their vehicles. For example, the instructions may be "SHUT OFF" engine when the corresponding traffic light is red, and when a cross traffic light turns yellow (or otherwise a predefined time before the corresponding traffic light turns green) instructions may be "RESTART" or "TURN ON" engine. Additionally, in some implementations, instructions may include an emergency message (e.g., Amber Alerts, weather conditions, traffic conditions) or an emergency number to contact (these instructions may be provided during any traffic light status). Also, other information may be provided in the instructions portion 224, including advertisements, news, or other types of information.

Further, instructions portion 224 may also include incentives for motorists to turn off their vehicles when instructed (e.g., traffic lights red status). Incentives may notify motorists of positive and/or negative information pertaining to idling the motorist's vehicle. For example, an incentive message may notify motorists that if they follow the "TURN OFF VEHICLE" and "RESTART VEHICLE" instructions, a motorists would (1) save a certain number of dollars in fuel cost over a period of time (e.g., one year), (2) save a certain number of gallons of fuel over a period of time (e.g., one year), and/or (3) reduce the motorist's carbon dioxide deposit into the atmosphere over a period of time.

Further, in some implementations, an incentive message is based on traffic pattern statistics specific to the traffic light for which the data processing apparatus receives data describing the light state. As such, the incentive information provided in the display area 220 at one traffic light may be different from the incentive information provided at another light, and the information may also vary depending on the time of day. For example, if traffic light A has a light state of red for an average of one minute (the incentive information may also take into account the time of day), then the incentive may calculate the gallons of gas saved over a period of one year using the one minute red light status of traffic light A. However, if traffic light B only has a light status of red for an average of forty seconds, then the display device associated with traffic light B may calculate the gallons of gas saved over a period of one year using the forty second red light status of traffic light B.

Additionally, incentives may be, for example, references or citations to any type of ordinance, law, proposed law, or regulation in the area or jurisdiction (e.g., county, city, state) that pertains to and/or requires motorists to not allow their vehicle to idle more than a certain period of time (e.g., no more than five consecutive minutes) or otherwise require motorists to follow instructions provided on the traffic information display device 110. Also, in some implementations, incentives may be information and/or statistics related to harmful environmental and/or health effects contributed to by idling motor vehicles, and/or information related to a motorist not following the notifications in the information section (e.g., the turn off and restart vehicle instructions). For example, incentives may be presented that provide motorists with (1) a certain number of dollars in added fuel cost over a period of time if the idling notifications are not followed (e.g., one year), (2) a certain number of added gallons of fuel over a period of time if the idling notifications are not followed (e.g., one year), and/or (3) an addition to the motorist's carbon dioxide deposit into the atmosphere over a period of time if the idling notifications are not followed. However, the examples above are not meant to limit the incentives that may be shown, and any type of information that may be incentivizing for motorists to stop their vehicle from idling at traffic lights or other locations may be included.

Timing portion 226 may include an indicator that counts to a traffic light status change (e.g., count down by seconds to zero) and/or a time when the instruction in the instruction portion 224 will change (e.g., a predetermined time before the corresponding traffic light will change). In some implementations, timing portion 226 is not required, and in some implementations, timing portion 226 is part of the instructions portion 224 of the display area 220. The control portion 250 includes a connection to one or more traffic light (via a wired or wireless connection) and/or one or more other component of the traffic light system 100 to sync the traffic light status with the timing portion 226 and other components of the traffic information display device 110.

Observation component 230 may include one or more sensor or component to observe current setting and information within the vicinity of the traffic information display device 110 and/or one or more traffic light (e.g., traffic light 120a, 120b, 121a, 121b). For example, observation component 230 may include one or more exhaust monitor and/or one or more camera. Each of the one or more components may be connected to or located next to or away from the traffic information display device 110. Each of the one or more components may be configured to communicate directly or indirectly with traffic information display device 110 and one or more of the monitoring offices 130a and 130b. For one or more cameras, in some implementations, an individual associated with one or more monitoring office 130a and 130b may be able to view the content the one or more cameras are capturing. If the individual associated with the one or more monitoring offices 130a and 130b sees or is otherwise notified of problems at one or more of the traffic lights or traffic information display devices 110, then the individual may be able to contact or notify one or more supporter of the incident. The one or more supporter has or is provided with the capability to assist with the problems. The problems may be, for example, a stranded vehicle in the intersection, debris in the roadway, issues with one or more traffic lights, among others. The one or more supporter may use a support vehicle (e.g., a tow truck or other type of vehicle that is provided with items and capabilities of assisting motorists with accidents or roadside problems) to assist.

Control 250 is a data processing apparatus that includes a memory 252 operatively connected to a processor 254. The processor 254 may be one or more general-purpose or specific-purpose processors or microcontrollers for controlling the operations and functions of the traffic information display device 110. In some implementations, the processor 254 may include a plurality of processors, computers, servers, or other processing elements in one or more locations for performing different functions within the traffic light system 100.

The memory 252 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc. The memory 252, processor 254, and different components of each the memory 252 and processor may be located in one or more locations, including at the traffic information display device 110 and/or one or more monitoring office. Programs and other commands for the traffic information display device 110 (e.g., illuminating the proper portions of the lighted display area 220 to communicate the programmed or selected message or information to motorists) and/or one or more traffic light may be stored at memory 252 and executed by processor 254.

Control 250 also includes a communication device 256 that enables communication between the traffic information display device 110 and one or more traffic lights and/or one or more monitoring offices. The communication device 256 may communicate over communication network 102 or other ways of communication, and communication device 256 may support wired networks, wireless networks, Bluetooth networks, WiFi networks, WiMax networks, RF networks, local area networks (LAN), internet networks, wide area networks (WAN), cellular telephone network, hardwired telephone networks, 900 MHz wireless networks, and satellite networks, among others.

Figure 3:
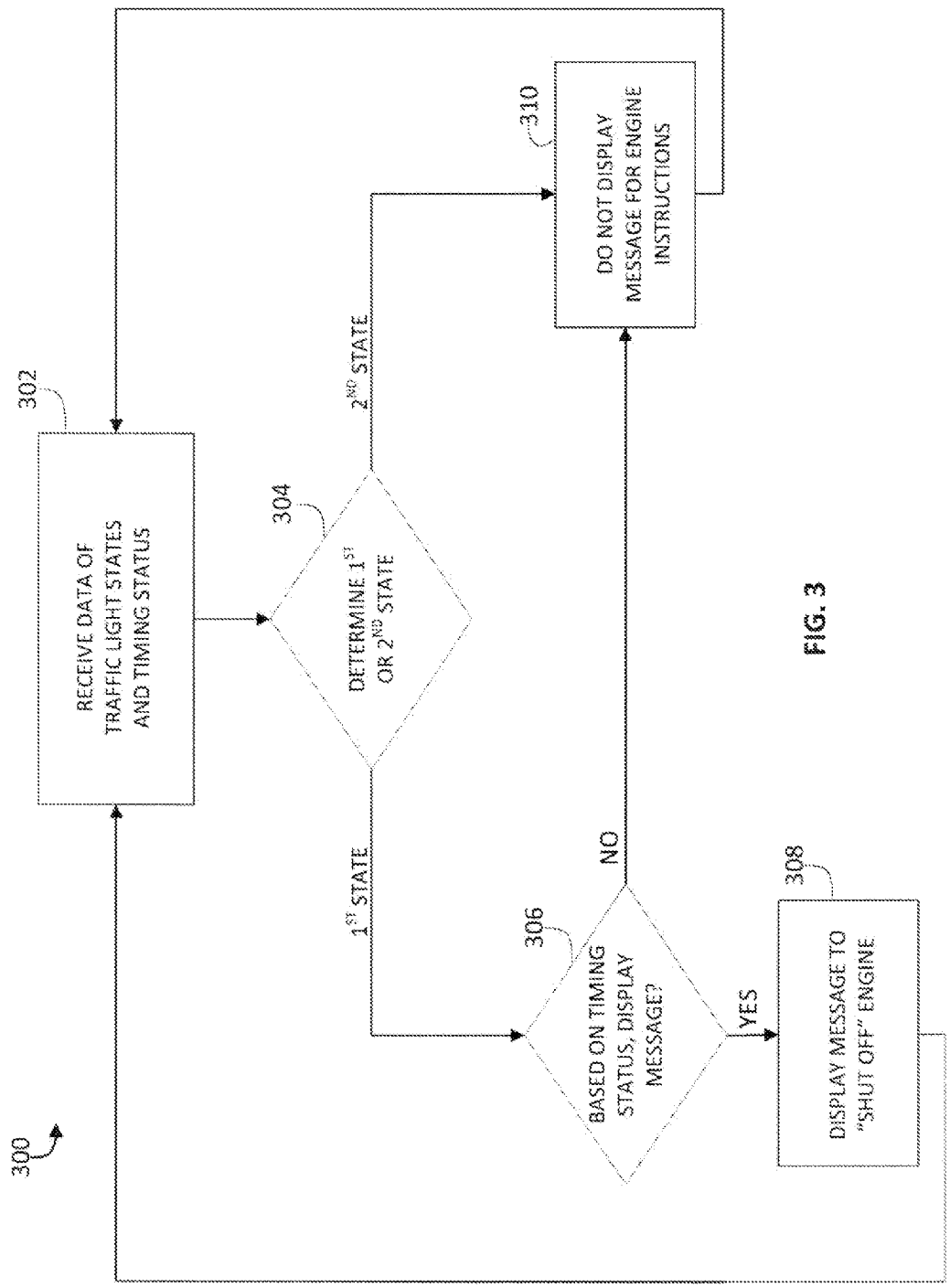
FIG. 3 is a flow diagram of an example process for a traffic light system.

FIG. 3 is a flow diagram 300 of an example process for a traffic light system. At step 302, the state of one or more traffic light and timing status associated with the traffic light state is received by a data processing apparatus. The data processing apparatus may be a component of control 250 (e.g., memory 252 and processor 254), a component of one or more monitoring office 130, a component of one or more traffic light, or a combination of one or more component of the aforementioned control 250, monitoring office 130, and traffic light.

At step 304, the data processing apparatus determines the state of a particular traffic light from the received data. In some implementations, a particular traffic light may be in a first state or a second state. In some implementations, the first state may be when the traffic light is red or otherwise informing motorists to "stop" at the traffic light (e.g., flashing red light). In some implementations, the second state is any traffic light state that is not the first state (e.g., yellow, green, flashing yellow, etc.). In some implementations, if the status of the traffic light is determined to be yellow, green, or emergency status (described below), an emergency message or an emergency number to contact may be provided in the instructions portion 224. Also, other information may be provided in the instructions portion 224, including advertisements and news, among others, during traffic light status of green lights, yellow lights, emergency status, and in some implementations, red lights.

The status of one or more traffic lights may be determined to be emergency status when the connection between one or more traffic information display devices 110 and one or more traffic lights is disrupted, the electrical power for one or more traffic lights associated with the one or more traffic information display devices 110 is disrupted, one or more monitoring office adjusts one or more traffic light status to emergency status (e.g., based on a stalled car or accident in an area that affects one or more traffic light in the related traffic light system), among others. In some implementations, in the emergency status, the traffic light may flash red and/or the traffic information display device 110 may indicated an emergency or provide information about the emergency, information pertaining to directions (e.g., detours or turning off engines) and/or incentives.

In flow diagram 300, if the particular traffic light is determined to be in the first state, then at step 306 the data processing apparatus determines if a message should be displayed, given the timing status. For example, in some implementations, a predetermined or adjusting amount of time before the light status is set or scheduled to change may be set. Such a time may be, for example, 45 seconds, or some other time.

If the current time at the time of the determination in step 308 is made is after the predetermined or adjusting amount of time (or the time remaining until a status change is less than the predetermined or adjusted amount of time), then a message may not be displayed or the message that is displayed may be different. However, if the current time at the time of the determination in step 308 is made is before the predetermined or adjusting amount of time (or the time remaining until a status change is greater than the predetermined or adjusted amount of time), then as seen in step 308, the traffic information display device 110 will display a message for motorists to "shut off" their engines. Further, if in the determination at step 304, the particular traffic light is determined to be in the second state, then as seen in step 310, the traffic information display device 110 will not display a message for engine instructions.

Figure 4:
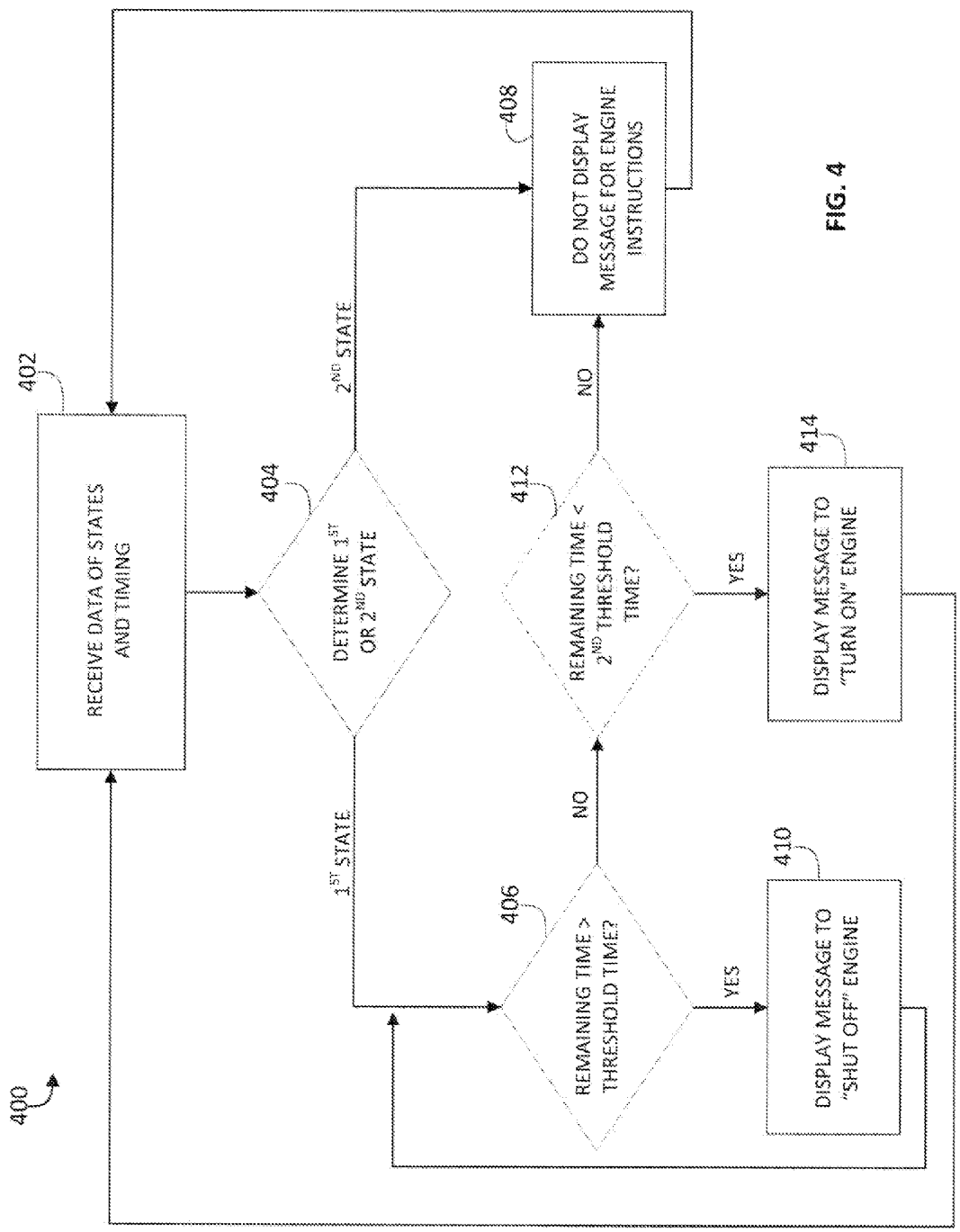
FIG. 4 is a flow diagram of another of example process for a traffic light system.

FIG. 4 is a flow diagram of another example process for a traffic light system. At step 402, the state of one or more traffic light and timing status associated with the traffic light state is received by a data processing apparatus (e.g., described in FIG. 3).

At step 404 the data processing apparatus determines the state of a particular traffic light. In some implementations, the first state may be when the traffic light is red or otherwise informing motorists to "stop" at the traffic light, and the second state is any traffic light state that is not the first state. If the particular traffic light is determined to be in the first state, then at step 406 the data processing apparatus determines if the time remaining before the traffic light status changes is greater than a threshold amount of time (as previously described, the threshold amount of time may be predetermined or adjusted). If the particular traffic light is determined to be in the second state, then at step 408 the traffic information display device 110 will not display a message for engine instructions.

In step 406, if the time remaining before the traffic light status changes is greater than the threshold amount, then the process moves to step 410 where the traffic information display device 110 will display a message for motorists to "shut off" their engines. If the time remaining before the traffic light status changes is less than the threshold amount, the process may proceed to step 408.

However, in some implementations, step 412 may be performed. At step 412, the data processing apparatus determines if the time remaining before the traffic light status changes is less than a second (different) threshold time (e.g., ten seconds). If the time remaining is less than the second threshold time, then at step 414 the traffic information display device 110 will display a message for motorists to "turn on" their engines. In some implementations, the second threshold time is a time that is less than the first time threshold, but greater than zero (i.e., the time the traffic light status changes).

Step 414 provides instructions to motorists to enable them to have their vehicle on when the traffic light status changes. However, if at step 412 the data processing apparatus determines the time remaining before the traffic light status changes is greater than the second threshold time, e.g., less than 45 seconds but greater than ten seconds, then the process will proceed to step 408 where the traffic information display device 110 will not display a message for engine instructions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   a display device that is associated with a traffic light and configured to be positioned for display next to the traffic light so that a plurality of motorists can view both the traffic light and the display device;
   a communication subsystem;
   a data processing apparatus in data communication with the display device and the communication subsystem and configured to perform operations comprising:
      receiving data describing a light state of the traffic light and timing status of the traffic light, wherein:
         the light states include a first state indicating the traffic light is displaying a stop signal, and a second state indicating the traffic light is not displaying a stop signal; and
         the timing status describes the time remaining of current state to transition to another state;
      receiving data describing traffic pattern statistics specific to the traffic light for which the data processing apparatus receives data describing the light state;
      determining, based on the state of the traffic light and the timing status, one of a plurality of messages to display on the display device, wherein the messages include a first message to shut off an engine, the determining further comprising:
         determining, based on the traffic pattern statistics specific to the traffic light, an incentive message that describes a saving associated with shutting off an engine as specified by the first message; and
      displaying the first message with the incentive message.

2. The system of claim 1, wherein:
   the messages include a second message to turn on an engine; and
   the first message and the second message are displayed for respective different combinations of light states and timing status.

3. The system of claim 2, wherein the operations to determine, based on the state of the traffic light and the timing status, one of a plurality of messages to display on the display device comprise:
   determining to display the first message when the light state is the first state and the timing status indicates a time remaining for the first state exceeds a first time threshold.

4. The system of claim 3, wherein the operations to determine, based on the state of the traffic light and the timing status, one of a plurality of messages to display on the display device comprise:
   determining to display the second message when the light state is the first state and the timing status indicates a time remaining for the first state does not exceed the first time threshold.

5. The system of claim 3, wherein the operations to determine, based on the state of the traffic light and the timing status, one of a plurality of messages on the display device comprise:
   determining to display the second message when the light state is the first state and the timing status indicates a time remaining for the first state does not exceed a second time threshold that is less than the first time threshold, wherein the second time threshold is greater than zero.

6. The system of claim 1, wherein the incentive message indicates at least one of fuel cost savings, fuel savings, and reduced carbon dioxide deposits over a period of time realized by a motorist turning off an engine at the traffic light.

7. The system of claim 1, wherein:
   the operations to determine, based on the state of the traffic light and the timing status, one of a plurality of messages on the display device comprise:
   determining to display the first message when the light state is the first state; and
   the first message includes count down data that displays the time until the traffic light switches from the first state to a second state.

8. A traffic information display device, comprising:
   a processor and a memory, the processor being communicatively coupled to the memory, and the processor configured to perform operations including;
      receiving data describing a light state of a traffic light and timing status of the traffic light, wherein:
         the light states include a first state indicating the traffic light is displaying a stop signal, and a second state indicating the traffic light is not displaying a stop signal; and
         the timing status describes the time remaining of current state to transition to another state;

receiving data describing traffic pattern statistics specific to the traffic light for which the data processor receives data describing the light state;

determining, based on the state of the traffic light and the timing status, one of a plurality of messages on the display device, wherein the messages include a first message to shut off an engine, the determining further comprising:

determining, based on the traffic pattern statistics specific to the traffic light, an incentive message that describes a saving associated with shutting of an engine as specified by the first message;

a communication device, the communication device being communicatively connected to at least one of a traffic light and a monitoring office; and a display area in communication with the processor;

wherein the traffic information display device is associated with the traffic light and configured to be positioned for display next to the traffic light so that a plurality of motorists can view both the traffic light and the display device and the first message is displayed with the incentive message in the display area.

9. The traffic information display device of claim 8, wherein:

the messages include a second message to turn on an engine; and the first message and the second message are displayed for respective different combinations of light states and timing status.

10. The traffic information display device of claim 9, wherein the operations to determine, based on the state of the traffic light and the timing status, one of a plurality of messages on the display device comprise:

determining to display the first message when the light state is the first state and the timing status indicates a time remaining for the first state exceeds a first time threshold.

11. The traffic information display device of claim 10, wherein the operations to determine, based on the state of the traffic light and the timing status, one of a plurality of messages on the display device comprise:

determining to display the second message when the light state is the first state and the timing status indicates a time remaining for the first state does not exceed the first time threshold.

12. The traffic information display device of claim 8, wherein the traffic information display device includes an observation component.

13. The traffic information display device of claim 8, wherein the incentive message indicates least one of fuel cost savings, fuel savings, and reduced carbon dioxide deposits over a period of time realized by a motorist turning off an engine at the traffic light.

14. An information and instruction method in response to a traffic light signal, comprising:

receiving data describing a light state of the traffic light and timing status of the traffic light, wherein:

the light states include a first state indicating the traffic light is displaying a stop signal, and a second state indicating the traffic light is not displaying a stop signal; and the timing status describes the time remaining of current state to transition to another state;

receiving data describing traffic pattern statistics specific to the traffic light for which the data processing apparatus receives data describing the light state;

determining, based on the state of the traffic light and the timing status, one of a plurality of messages to display on a display device positioned for display next to the traffic light so that a plurality of motorists can view both the traffic light and the display device, wherein the messages include a first message to shut off an engine, the determining further comprising:

determining, based on the traffic pattern statistics specific to the traffic light, an incentive message that describes a saving associated with shutting off an engine as specified by the first message; and displaying the first message with the incentive message on the display device.

15. The information and instruction method of claim 14, wherein:

the messages include a second message to turn on an engine; and the first message and the second message are displayed for respective different combinations of light states and timing status.

16. The information and instruction method of claim 15, wherein the operations to determine, based on the state of the traffic light and the timing status, one of a plurality of messages on the display device further comprises:

determining to display the first message when the light state is the first state and the timing status indicates a time remaining for the first state exceeds a first time threshold.

17. The information and instruction method of claim 15, wherein the operations to determine, based on the state of the traffic light and the timing status, one of a plurality of messages on the display device further comprises:

determining to display the second message when the light state is the first state and the timing status indicates a time remaining for the first state does not exceed the first time threshold.

18. The information and instruction method of claim 14, wherein the incentive message indicates least one of fuel cost savings, fuel savings, and reduced carbon dioxide deposits over a period of time realized by a motorist turning off an engine at the traffic light.

19. The system of claim 1, wherein the traffic pattern statistics specify a number of motorists stopped at the traffic light for an average time and a time period that encompasses a plurality of times that the traffic light is in the first state, and determining, based on the traffic pattern statistics specific to the traffic light, the incentive message that describes the saving associated with shutting of an engine as specified by the first message comprises determining the cost savings based on a plurality of motorists, the average time, and the plurality of times that the traffic light is in the first state.

20. The traffic information display device of claim 8, wherein the traffic pattern statistics specify a number of motorists stopped at the traffic light for an average time and a time period that encompasses a plurality of times that the traffic light is in the first state, and determining, based on the traffic pattern statistics specific to the traffic light, the incentive message that describes the saving associated with shutting of an engine as specified by the first message comprises determining the cost savings based on a plurality of motorists, the average time, and the plurality of times that the traffic light is in the first state.

21. The information and instruction method of claim 14, wherein the traffic pattern statistics specify a number of motorists stopped at the traffic light for an average time and a time period that encompasses a plurality of times that the traffic light is in the first state, and determining, based on the traffic pattern statistics specific to the traffic light, the incentive message that describes the saving associated with shutting of an engine as specified by the first message comprises determining the cost savings based on a plurality of motorists, the average time, and the plurality of times that the traffic light is in the first state.

\* \* \* \* \*